United States Patent [19]

Tochizawa et al.

[11] Patent Number: 5,480,093
[45] Date of Patent: Jan. 2, 1996

[54] COMBUSTION HEATER SYSTEM FOR MOTOR VEHICLES

[75] Inventors: Toru Tochizawa; Toshikatsu Takanohashi, both of Wako, Japan

[73] Assignee: Honda Giken Kogyo Kabushiki Kaisha, Tokyo, Japan

[21] Appl. No.: 216,888

[22] Filed: Mar. 24, 1994

[30]     Foreign Application Priority Data

Mar. 24, 1993 [JP] Japan .................................. 5-065535

[51] Int. Cl.⁶ ........................................................ B60H 1/22
[52] U.S. Cl. ........................ 237/12.3 C; 431/28; 431/73; 431/259
[58] Field of Search .................... 237/12.3 C; 431/28, 431/36, 73, 74, 259

[56]             References Cited

U.S. PATENT DOCUMENTS

| 4,519,772 | 5/1985 | Mittmann | 237/12.3 C X |
| 5,082,175 | 1/1992 | Koch et al. | 237/12.3 C |
| 5,137,445 | 8/1992 | Chu | 237/12.3 C X |

FOREIGN PATENT DOCUMENTS

| 3742561 | 12/1988 | Germany | 237/12.3 C |
| 57-40418 | 8/1982 | Japan . | |

*Primary Examiner*—William E. Tapolcai
*Attorney, Agent, or Firm*—Nikaido, Marmelstein, Murray & Oram

[57]                ABSTRACT

A combustion heater system for use in a moter vehicle has a combustion chamber housing a combustion pad which is heated by a pre-glow plug for vaporizing a fuel that is supplied from a fuel tank through a solenoid-operated valve to the combustion pad. The combustion chamber is supplied with air from a fan, and houses a spark plug for producing sparks in the combustion chamber to ignite a fuel vapor emitted from the combustion pad. The combustion heater system has a control unit which energizes the pre-glow plug to heat the combustion pad, actuates the solenoid-operated valve to supply the fuel to the combustion pad, and actuates the fan to supply air to the combustion chamber. The control unit subsequently energizes the spark plug to produce sparks upon elapse of a preset period of time hereby to ignite the fuel vapor emitted from the combustion pad for producing flames in the combustion chamber. To extinguish the flames, the control unit inactivates the solenoid-operated valve to stop supplying the fuel to the combustion pad and subsequently inactivates the fan to stop supplying air to the combustion chamber.

13 Claims, 6 Drawing Sheets

COMBUSTION HEATER SYSTEM FOR MOTOR VEHICLES

BACKGROUND OF THE INVENTION

1. Field of the Invention

The present invention relates to a combustion heater system for use in a motor vehicle, and more particularly to a combustion heater system having a control unit for controlling the ignition and extinction of a combustion heater which utilizes the heat of combustion of a fuel in a motor vehicle with a clean power plant, such as an electric vehicle.

2. Description of the Prior Art

Figure 4:
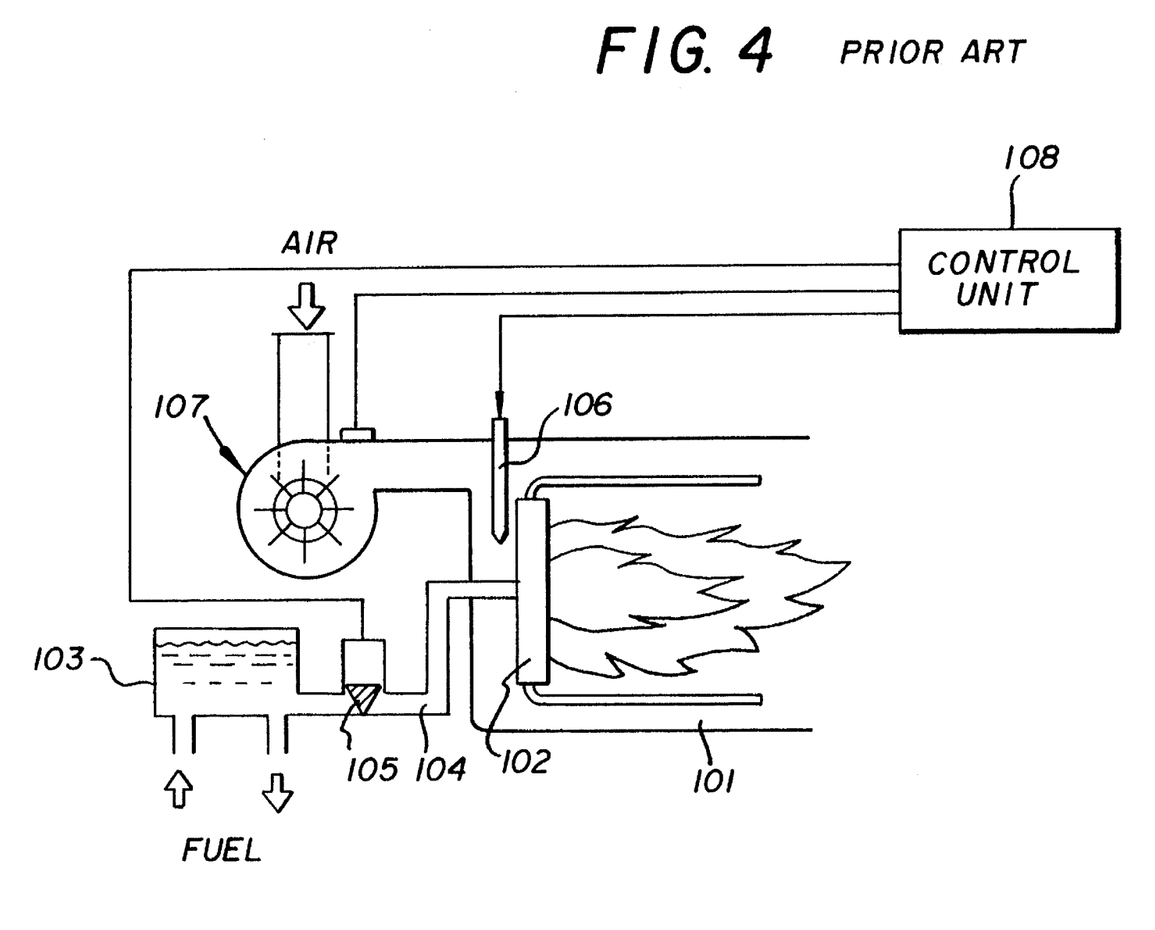
FIG. 4 is a schematic view of a conventional combustion heater system.

FIG. 4 of the accompanying drawings shows a conventional combustion heater system for use in a motor vehicle with a clean power plant, such as an electric vehicle. The illustrated combustion heater system has a combustion pad 102 disposed in a combustion chamber 101, a fuel supply passage 104 for supplying a fuel from a fuel tank 103 to the combustion pad 102, a solenoid-operated valve 105 for selectively opening and closing the fuel supply passage 104, a glow plug 106 for heating the combustion pad 102, a fan 107 for supplying air into the combustion chamber 101, and a control unit 108 for controlling the solenoid-operated valve 105, the glow plug 106, and the fan 107.

Figure 5A:
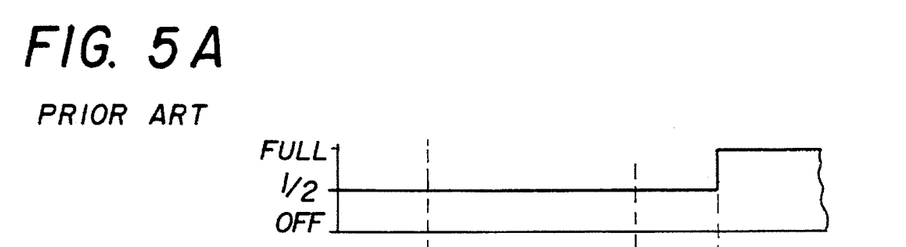
FIGS. 5A through 5C are timing charts of various signals applied by a control unit of the conventional combustion heater system shown in FIG. 4.
Figure 5B:
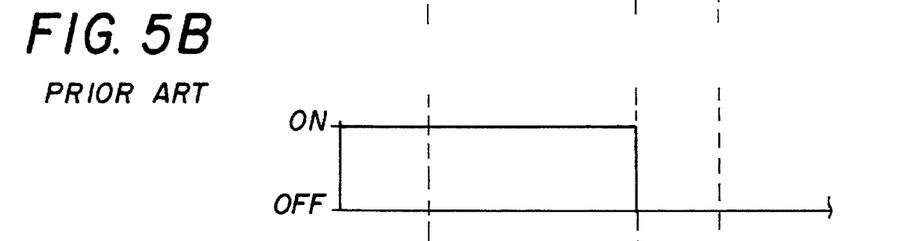
Figure 5C:
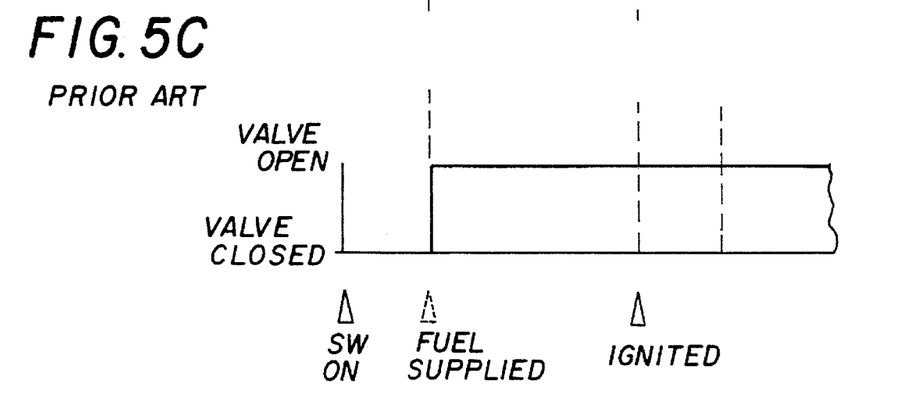

When the starter switch of the conventional combustion heater system is turned on, the control unit 108 rotates the fan 107 at a half output rate to supply air into the combustion chamber 101 as shown in FIG. 5A of the accompanying drawings, and the control unit 108 energizes the glow plug 106 to pre-glow the combustion pad 102 for 30 seconds, for example, as shown in FIG. 5B of the accompanying drawings. Thereafter, the control unit 108 actuates the solenoid-operated valve 105 to open the fuel supply passage 104 for thereby supplying the fuel to the combustion pad 102 as shown in FIG. 5C of the accompanying drawings. The control unit 108 continues to energize the glow plug 106 for 60 seconds, for example, to heat the combustion pad 102 up to a temperature at which the fuel can be ignited. When the fuel supplied to the combustion pad 102 is ignited by spontaneous combustion, the control unit 108 de-energizes the glow plug 106. After having waited for 20 seconds, for example, until the combustion of the fuel is stabilized, the control unit 108 rotates the fan 107 at a full output rate.

Figure 6A:
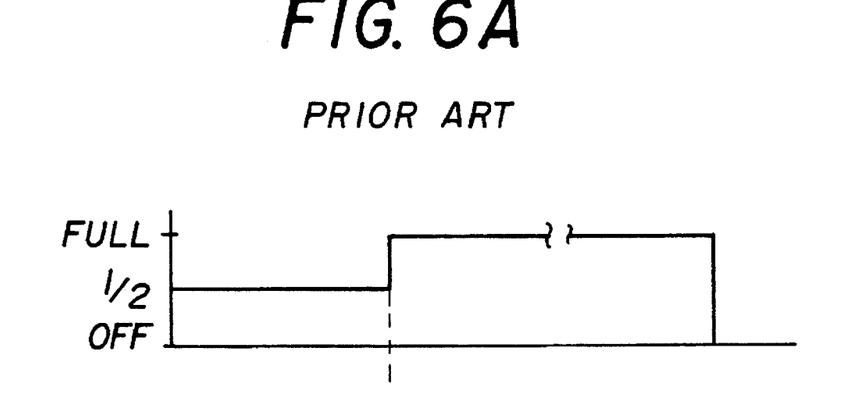
FIGS. 6A and 6B are timing charts of various signals applied by the control unit to stop activating the conventional combustion heater system shown in FIG. 4.
Figure 6B:
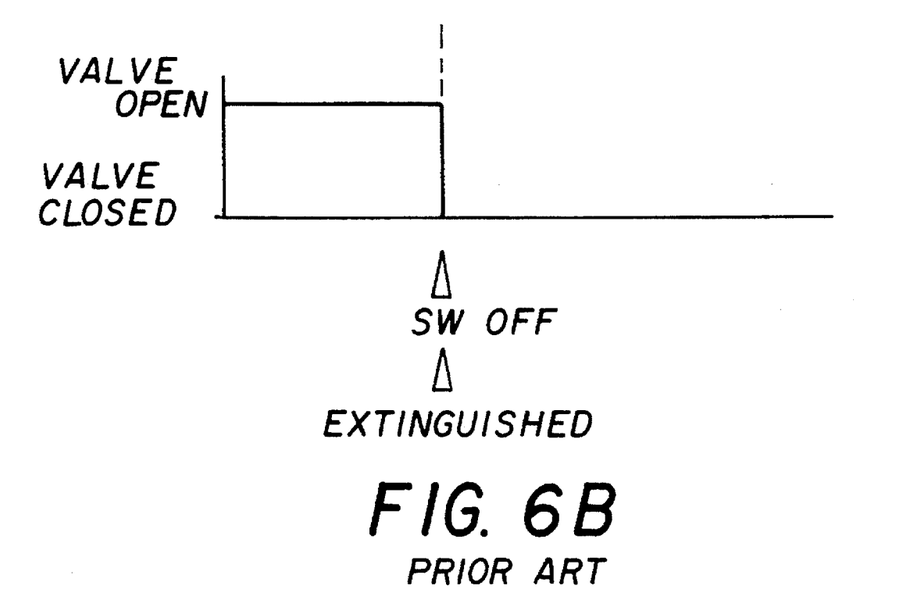

When the starter switch of the conventional combustion heater system is turned off, the control unit 108 inactivates the solenoid-operated valve 105 to close the fuel supply passage 104 for thereby stopping the supply of the fuel to the combustion pad 102 to extinguish the same as shown in FIG. 6B of the accompanying drawings. As shown in FIG. 6A of the accompanying drawings, the control unit 108 rotates the fan 107 at a full output rate to discharge any unburned gas from the combustion chamber 101. After elapse of a predetermined period of time, the control unit 108 turns off the fan 107. In some combustion heater systems, the fuel is extinguished by inactivating the fan to stop supplying the air into the combustion chamber, or the fuel is extinguished by stop supplying both the fuel and the air.

With the above conventional combustion heater system, however, when the fuel is to be ignited, the air is continuously supplied to the combustion chamber 101 by the fan 107 until the fuel supplied to the combustion pad 102 is ignited, i.e., from the time at which the fuel is supplied to the time at which the fuel is ignited by spontaneous combustion. Therefore, before the fuel is ignited, the fuel supplied to the combustion pad 102 is vaporized and discharged, resulting an undesirable unburned fuel emission. In addition, since the air required for the fuel to be combusted is supplied while the glow plug 106 is being energized, the glow plug 106 is deprived of heat by the air flow. As a consequence, a certain amount of electric energy is wasted by the glow plug 106, and a relatively long period of time is consumed before the fuel is ignited.

When the fuel is to be extinguished, the supply of the fuel to the combustion pad 102 is stopped. However, because the fan 107 is continuously actuated, the amount of heat and the amount of supplied air are brought out of balance. Though the flame is put out, the fuel attached to the combustion pad 102 is vaporized by the supplied air and discharged out of the combustion chamber 101. If the supplied air is stopped to extinguish the fuel, then the flame is put out, and the fuel remains unburned in the combustion pad 102. The remaining fuel is vaporized by the heat of the combustion pad 102 and discharged out of the combustion chamber 101.

Therefore, the conventional combustion heater system tends to produce a large amount of unburned fuel emission when the fuel is ignited and extinguished.

Japanese patent publication No. 57-40418, published Aug. 27, 1982, discloses an apparatus for controlling a heated water source in a combustion heater system for use in an automobile.

SUMMARY OF THE INVENTION

It is an object of the present invention to provide a combustion heater system for motor vehicles which is capable of igniting a fuel quickly and reliably and minimizing an undesirable unburned fuel emission before the fuel starts being combusted.

Another object of the present invention is to provide a combustion heater system for motor vehicles which is capable of extinguishing a fuel reliably and minimizing an undesirable unburned fuel emission before the fuel starts being combusted.

According to the present invention, there is provided a combustion heater system for use in a motor vehicle, comprising a combustion chamber, a combustion pad disposed in the combustion chamber, a fuel supply passage connected to the combustion pad for supplying a fuel to the combustion pad, valve means for selectively opening and closing the fuel supply passage, air supply means for supplying air to the combustion chamber, heating means for heating the combustion pad, spark means for producing sparks in the combustion chamber to ignite a fuel vapor emitted from the combustion pad, and control means for energizing the heating means to heat the combustion pad, actuating the valve means to open the fuel supply passage, actuating the air supply means to supply air to the combustion chamber, and subsequently energizing the spark means to produce sparks in the combustion chamber upon elapse of a preset period of time which begins with the energization of the heating means and is determined depending on conditions for vaporization of the fuel.

According to the present invention, there is also provided a combustion heater system comprising a combustion chamber housing a combustion pad for vaporizing a fuel with heat, heating means for heating the combustion pad, fuel supply means for supplying the fuel to the combustion pad, air supply means for supplying air to the combustion chamber, spark means for producing sparks in the combustion chamber to ignite a fuel vapor emitted from the combustion pad, and control means for energizing the heating means to heat the combustion pad, actuating the fuel supply means to supply the fuel to the combustion pad, actuating the air supply means supply air to the combustion chamber, and subsequently energizing the spark means to produce sparks upon elapse of a preset period of time thereby to ignite the fuel vapor emitted from the combustion pad, and for inactivating the fuel supply means to stop supplying the fuel to the combustion pad and subsequently inactivating the air supply means to stop supplying air to the combustion chamber.

According to the present invention, there is also provided a combustion heater system according to claim 8, further comprising flame condition detecting means for detecting a flame condition in the combustion chamber, the control means comprising means for continuously energizing the spark means to produce sparks upon elapse of a predetermined period of time depending on the flame condition detected by the flame condition detecting means, after elapse of the preset period of time.

According to the present invention, there is also provided a combustion heater system for use in a motor vehicle, comprising a combustion chamber, a combustion pad disposed in the combustion chamber, a fuel supply passage connected to the combustion pad for supplying a fuel to the combustion pad, valve means for selectively opening and closing the fuel supply passage, air supply means for supplying air to the combustion chamber, heating means for heating the combustion pad, spark means for producing sparks in the combustion chamber to ignite a fuel vapor emitted from the combustion pad, flame condition detecting means for detecting a flame condition in the combustion chamber, and control means for energizing the heating means to heat the combustion pad for a predetermined period of time which begins with the energization of the heating means, and subsequently energizing the spark means to produce sparks in the combustion chamber and continuously energizing the spark means until a flame condition is detected by the flame condition detecting means.

According to the present invention, there is also provided a combustion heater system for use in a motor vehicle, comprising a combustion chamber, a combustion pad disposed in the combustion chamber, a fuel supply passage connected to the combustion pad for supplying a fuel to the combustion pad, valve means for selectively opening and closing the fuel supply passage, air supply means for supplying air to the combustion chamber, heating means for heating the combustion pad, flame condition detecting means for detecting a flame condition in the combustion chamber, and control means for controlling the air supply means to vary the amount of air supplied therefrom to the combustion chamber depending on the flame condition detected by the flame condition detecting means.

According to the present invention, there is further provided a combustion heater system for use in a motor vehicle, comprising a combustion chamber, a combustion pad disposed in the combustion chamber, a fuel supply passage connected to the combustion pad for supplying a fuel to the combustion pad, valve means for selectively opening and closing the fuel supply passage, air supply means for supplying air to the combustion chamber, heating means for heating the combustion pad, flame condition detecting means for detecting a flame condition in the combustion chamber, and control means for controlling the air supply means to vary the amount of air supplied therefrom to the combustion chamber depending on the flame condition detected by the flame condition detecting means when the fuel supplied to the combustion pad is to be extinguished.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

The principles of the present invention are particularly useful when embodied in a combustion heater system incorporated in an air-conditioning system on a motor vehicle.

Figure 1:
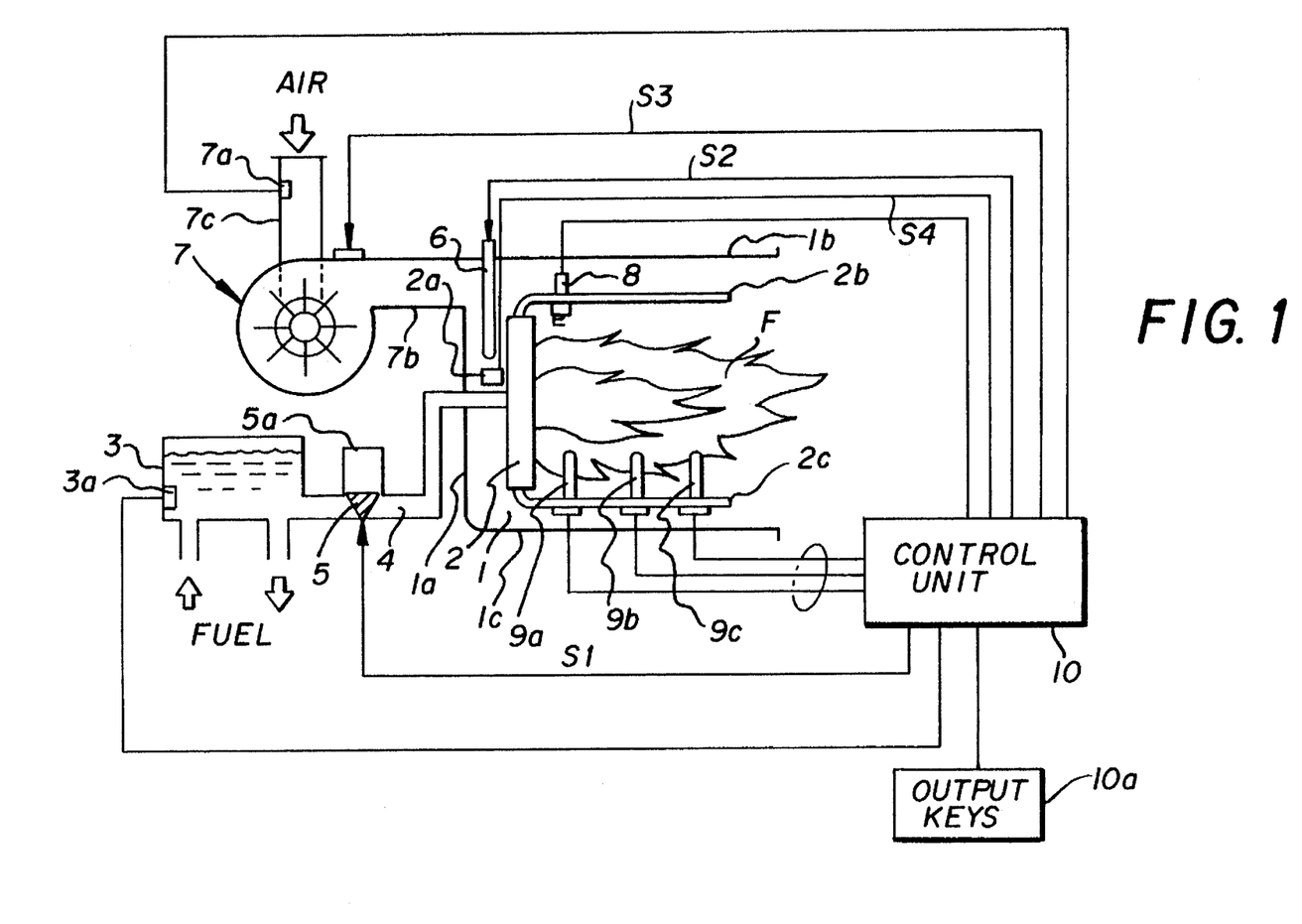
FIG. 1 is a schematic view of a combustion heater system according to the present invention.

The combustion heater system according to the present invention includes a combustion heater having a combustion chamber 1 which houses a combustion pad 2 therein.

The combustion pad 2 is connected to a fuel tank 3 for storing a liquid fuel such as gasoline, gas oil, or kerosene, through a fuel supply passage 4 which extends through a rear wall 1a of the combustion chamber 1. The fuel supply passage 4 can selectively be opened and closed by a solenoid-operated fuel valve 5 disposed therein which can be actuated by a solenoid 5a. A temperature sensor 2a for detecting the temperature around the combustion pad 2 is positioned near the combustion pad 2. Another temperature sensor 3a for detecting the temperature of the fuel stored in the fuel tank 3 is positioned in the fuel tank 3.

The combustion chamber 1 also houses a glow plug 6 mounted on a side wall 1b thereof and positioned near the combustion pad 2, for heating the combustion pad 2. The combustion chamber 1 is connected to a fan 7 through an outlet duct 7b mounted on the rear wall 1a of the combustion chamber 1. The fan 7 is supplied with air through an inlet duct 7c in which there is disposed an air temperature sensor 7a for detecting the temperature of air flowing through the inlet duct 7c.

The combustion chamber 1 further houses a spark plug 8 positioned downstream of the glow plug 6 with respect to the direction in which air flows from the fan 7 through the outlet duct 7a into the combustion chamber 1. The spark plug 8 is supported on a side arm 2b connected to and extending from one side of the combustion pad 2 along the side wall 1b of the combustion chamber 1.

Three flame sensors 9a, 9b, 9c also housed in the combustion chamber 1 are mounted on another side arm 2c connected to and extending from an opposite side of the combustion pad 2 along a side wall 1c of the combustion chamber 1 which is opposite to and spaced from the side wall 1b. When the combustion heater is in operation, the fuel supplied from the fuel tank 3 to the combustion pad 2 is combusted producing a flame F in a space between the side arms 2b, 2c. The sensors 9a, 9b, 9c are successively arranged along the direction in which the flame F flows from the combustion pad 2, i.e., are spaced at successively different distances from the combustion pad 2. The sensors 9a, 9b, 9c serve to detect a flame condition in the combustion chamber 1, and output respective detected signals depending on the magnitude or position of the flame F. For example, the sensors 9a, 9b, 9c comprise temperature sensors, respectively, for detecting relatively high temperatures, and the condition of the flame F can be predicted from the temperature detected by these sensors 9a, 9b, 9c.

The combustion heater system includes a control unit 10 for controlling overall operation of the combustion heater. As described in detail below, the control unit 10 serves as means for controlling sparking in the combustion chamber 1, continued sparking in the combustion chamber 1, and the supply of air to the combustion chamber 1. In order to serve as these means, the control unit 10 controls the opening and closing of the solenoid-operated valve 5, the energization and de-energization of the glow plug 6, the operation of the fan 7, and the energization of the spark plug 8, and is supplied with detected signals from the flame sensors 9a, 9b, 9c. The temperature sensors 2a, 3a, 7a, 9a, 9b, 9c are electrically connected to the control unit 10. Input keys 10a are also connected to the control unit 10. The control unit 10 may comprise a microcomputer including a central processing unit, a random-access memory, a read-only memory, input and output interfaces, and a bus interconnecting these elements. The microcomputer is programmed to carry out the operation of the combustion heater as described below.

Figure 2A:
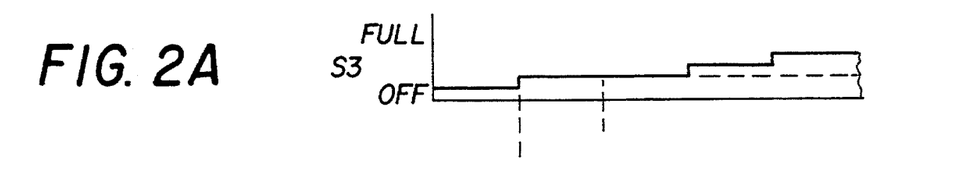
FIGS. 2A through 2D are timing charts of various signals applied by a control unit of the combustion heater system to start activating a combustion heater.

First, the control unit 10 operates to start activating the combustion heater as follows: When the main switch of the air-conditioning system combined with the combustion heater system is turned on, the control unit 10 applies a signal S1 (see FIG. 2D) to the solenoid 5a to open the solenoid-operated valve 5. The fuel supply passage 4 is opened to supply the fuel from the fuel tank 3 to the combustion pad 2.

Figure 2B:
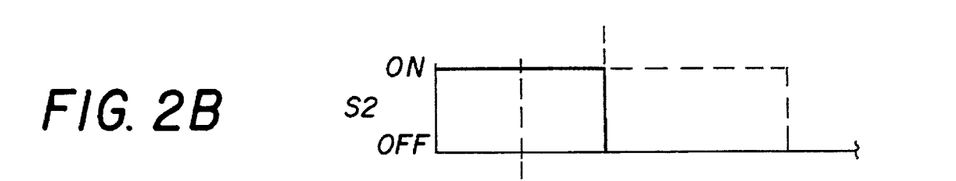

At the same time, as shown in FIG. 2B, the control unit 10 applies a signal S2 to the glow plug 6 to energize the glow plug 6 for thereby causing the combustion pad 2 to pre-glow, i.e., heating the combustion pad 2 before the fuel supplied to the combustion pad 2 is vaporized. The control 10 also supplies a signal S3 to the fan 7 to rotate the fan 7 at a quarter output rate for thereby supplying air through the outlet duct 7b into the combustion chamber 1.

The combustion pad 2 is caused by the glow plug 6 to pre-glow for a period of time, i.e., a pre-glow time, which is required for the fuel to be vaporized from the combustion pad 2. Specifically, the control unit 10 has a look-up table or a map which stores data representing different pre-glow times in relation to different conditions which affect vaporization of the fuel, including temperatures around the combustion pad 2, temperatures of air supplied to the fan 7, temperatures of the fuel stored in the fuel tank 3, and fuel volatility values. When the control unit 10 starts to operate the combustion heater, the control unit 10 determines the period of time for which the combustion pad 2 is to pre-glow from the look-up table or the map in the control unit 10 based on the temperature around the combustion pad 2 as detected by the temperature sensor 2a, the temperature of the air supplied to the fan 7 as detected by the temperature sensor 7a, the temperature of the fuel in the fuel tank 3 as detected by the temperature sensor 3a, and the fuel volatility as inputted by the input keys 10a. Since the combustion pad 2 is controlled to pre-glow for exactly the period of time required for the fuel to be vaporized from the combustion pad 2, it is not heated for an excessively long period of time, thus preventing the vaporized fuel from being discharged, unburned, from the combustion heater.

After elapse of the pre-glow time, which may be 2 seconds, for example, the control unit 10 applies a pulsed signal S4 (see FIG. 2C) to the spark plug 8, which is energized to produce sparks for igniting the fuel vapor emitted from the combustion pad 2. Simultaneously, the control unit 10 increases the level of the signal S3 to rotate the fan 7 at a half output rate for supplying an increased volume of air into the combustion chamber 1.

When a predetermined period of time, such as 2 seconds, for example, has elapsed from the first spark produced by the spark plug 8, the control unit 10 checks the detected signals from the flame sensors 9a, 9b, 9c. If the fuel vapor is ignited, then the control unit 10 turns off the glow plug 6 as indicated by the solid-line curve in FIG. 2B. Thereafter, while checking the detected signals from the flame sensors 9a, 9b, 9c, the control unit 10 increases the level of the signal S3 to rotate the fan 7 at a three-quarter output rate and then a full output rate for successively increasing the volume of air supplied into the combustion chamber 1.

Figure 2C:
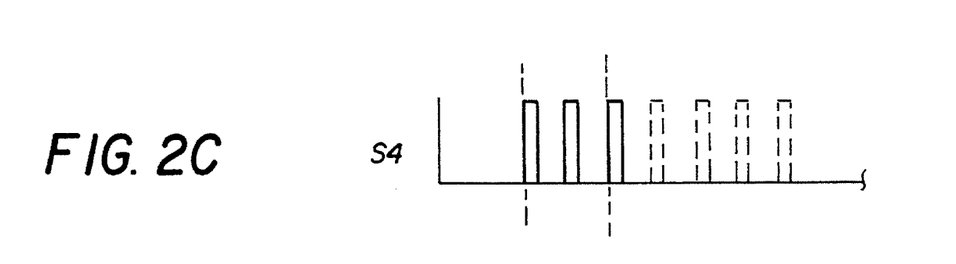
Figure 2D:
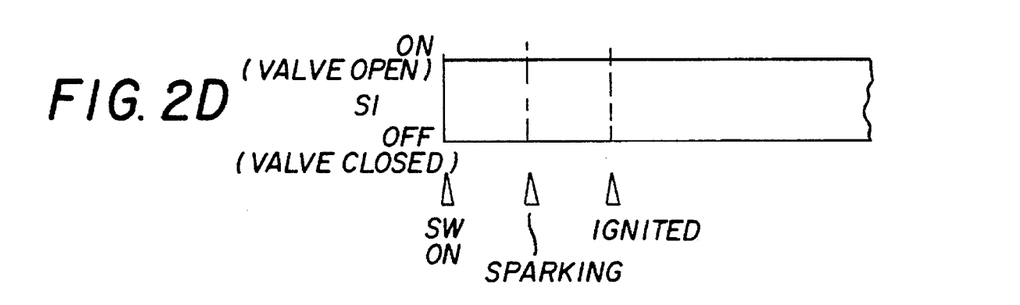

If the fuel vapor is not ignited upon elapse of the predetermined period of time after the first spark, then the control unit 10 keeps the glow plug 6 energized as indicated by the broken-line curve in FIG. 2B, and continuously controls the spark plug 8 to produce successive sparks in order to ignite the fuel vapor as indicated by the broken-line curve in FIG. 2C. At the same time, the control unit 10 maintains the level of the signal S3 to rotate the fan 7 at a half output rate as indicated by the broken-line curve in FIG. 2A.

As described above, the fuel supplied to the combustion pad 2 is heated and vaporized by the glow plug 6 which can be heated with a quick response, and the fuel vapor emitted from the combustion pad 2 is forcibly ignited by sparks produced by the spark plug 8 before the fuel vapor is ignited by spontaneous combustion which occurs at about 300° C. with gasoline, 260° C. with gas oil, and 230° C. with kerosene. Consequently, the time required for the fuel to be ignited is relatively short, and any unburned fuel vapor that is discharged from the combustion heater before it is ignited is minimized. Since any undesirable unburned fuel emission from the combustion heater is reduced, the fuel can economically be utilized.

Even if the fuel vapor is not ignited immediately, since sparks are successively produced by the spark plug 8 depending on the temperature in the combustion chamber 1, the fuel vapor can reliably be ignited. Accordingly, any undesirable unburned fuel emission from the combustion heater is also minimized.

The amount of air supplied to the combustion chamber 1 is increased stepwise as the fuel ignition process progresses. Specifically, before the fuel vapor is ignited, the amount of air supplied to the combustion chamber 1 is relatively small, and hence does not deprive the combustion pad 2 of heat while the combustion pad 2 is pre-glowing. Accordingly, the fuel supplied to the combustion pad 2 can reliably be vaporized by the heated combustion pad 2. During an initial stage of fuel ignition, the amount of air supplied to the combustion chamber 1 is increased, but not up to the full rate. Therefore, the fuel vapor starts being stably combusted as the flames produced by the initial ignition of the fuel vapor are not disturbed by the air flow introduced into the combustion chamber 1. Such a controlled air flow is also effective to suppress undesirable unburned fuel emission from the combustion heater.

The control unit 10 operates to stop activating the combustion heater as follows: When the main switch of the air-conditioning system is turned off, the control unit 10 de-energizes the solenoid 5a to close the solenoid-operated valve 5 as shown in FIG. 3B. The fuel supply passage 4 is closed to cut off the supply of the fuel from the fuel tank 3 to the combustion pad 2.

Figure 3A:
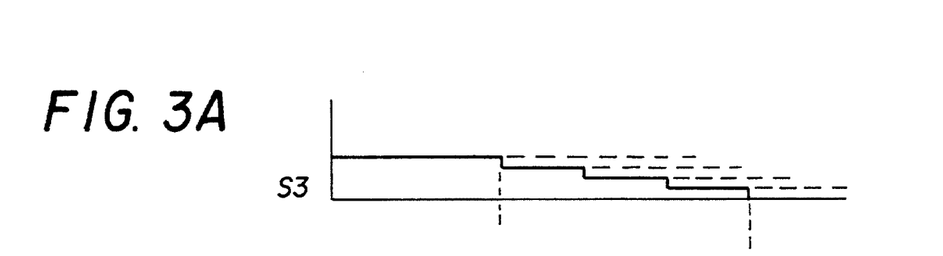
FIGS. 3A and 3B are timing charts of various signals applied by the control unit to stop activating the combustion heater.
Figure 3B:
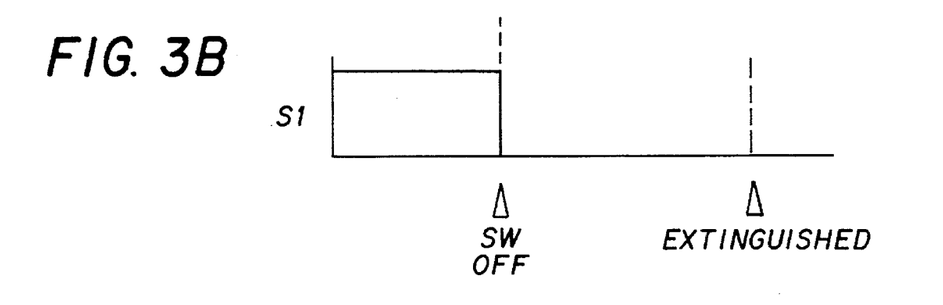

At the same time, while checking the detected signals from the flame sensors 9a, 9b, 9c, the control unit 10 successively reduces the level of the signal S3 to rotate the fan 7 at successively lower output rates for thereby reducing the volume of air supplied through the outlet duct 7a into the combustion chamber 1, as shown in FIG. 3A. Depending on the flame condition as detected by the flame sensors 9a, 9b, 9c, the control unit 10 may control the amount of air supplied to the combustion chamber 1 as indicated by the broken-line curves in FIG. 3A.

Since the amount of air supplied to the combustion chamber 1 is successively reduced depending on the flame condition in the combustion chamber 1, any fuel that remains in the combustion pad 2 after the fuel supply is cut off can fully be burned before the supply of air is completely stopped. Therefore, undesirable unburned fuel emission from the combustion heater is minimized when the combustion heater is inactivated.

The flame condition, i.e., the temperature, in the combustion chamber 1 can accurately be detected by the flame sensors 9a, 9b, 9c because the flame sensors 9a, 9b, 9c are spaced at different distances from the combustion pad 2. The accurately detected flame condition permits the control unit 10 to stop or continue sparking highly accurately and also to regulate the amount of air highly accurately while the combustion heater is in operation.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A combustion heater system for use in a motor vehicle, comprising:

a combustion chamber;

a combustion pad disposed in said combustion chamber;

a fuel supply passage connected to said combustion pad for supplying a fuel to the combustion pad;

valve means for selectively opening and closing said fuel supply passage;

air supply means for supplying air to said combustion chamber;

heating means for heating said combustion pad;

spark means for producing sparks in said combustion chamber to ignite a fuel vapor emitted from said combustion pad; and control means for energizing said heating means to heat the combustion pad, actuating said valve means to open said fuel supply passage, actuating said air supply means to supply air to said combustion chamber, and subsequently energizing said spark means to produce sparks in said combustion chamber upon elapse of a preset period of time which begins with the energization of said heating means and is determined depending on conditions for vaporization of the fuel.

2. A combustion heater system according to claim 1, wherein said preset period of time is determined based on at least one of the temperature of the fuel, the temperature of the air, and the temperature around said combustion pad.

3. A combustion heater system according to claim 1, further comprising flame condition detecting means for detecting a flame condition in said combustion chamber, said control means comprising means for continuously energizing said spark means to produce sparks in said combustion chamber for a predetermined period of time depending on the flame condition detected by said flame condition detecting means, after elapse of said preset period of time.

4. A combustion heater system according to claim 3, wherein said control means comprises means for controlling said air supply means to vary the amount of air supplied therefrom to said combustion chamber depending on the flame condition detected by said flame condition detecting means.

5. A combustion heater system according to claim 4, wherein said control means comprises means for controlling said air supply means to increase stepwise the amount of air supplied therefrom to said combustion chamber depending on the flame condition detected by said flame condition detecting means after said spark means is energized to produce sparks in said combustion chamber.

6. A combustion heater system according to claim 4, wherein said control means comprises means for inactivating said valve means to close said fuel supply passage, and means for controlling said air supply means to decrease stepwise the amount of air supplied therefrom to said combustion chamber depending on the flame condition detected by said flame condition detecting means after said fuel supply passage is closed by said valve means.

7. A combustion heater system according to claim 3, wherein said flame condition detecting means comprises a plurality of flame sensors disposed in said combustion chamber and spaced at respective different distances from said combustion pad.

8. A combustion heater system comprising:

a combustion chamber housing a combustion pad for vaporizing a fuel with heat;

heating means for heating said combustion pad;

fuel supply means for supplying the fuel to said combustion pad;

air supply means for supplying air to said combustion chamber;

spark means for producing sparks in said combustion chamber to ignite a fuel vapor emitted from said combustion pad; and control means for energizing said heating means to heat the combustion pad, actuating said fuel supply means to supply the fuel to said combustion pad, actuating said air supply means to supply air to said combustion chamber, one subsequently energizing said spark means to produce sparks upon elapse of a preset period of time thereby to ignite the fuel vapor emitted from said combustion pad, and for inactivating said fuel supply means to stop supplying the fuel to said combustion pad and subsequently inactivating said air supply means to stop supplying air to said combustion chamber.

9. A combustion heater system according to claim 8, further comprising flame condition detecting means for detecting a flame condition in said combustion chamber, said control means comprising means for continuously energizing said spark means to produce sparks upon elapse of a predetermined period of time depending on the flame condition detected by said flame condition detecting means, after or elapse of said preset period of time.

10. A combustion heater system according to claim 9, wherein said control means comprises means for controlling said air supply means to increase stepwise the amount of air supplied therefrom to said combustion chamber depending on the flame condition detected by said flame condition detecting means after said spark means is energized to produce sparks in said combustion chamber.

11. A combustion heater system according to claim 9, wherein said control means comprises means for controlling said air supply means to decrease stepwise the amount of air supplied therefrom to said combustion chamber depending on the flame condition detected by said flame condition detecting means after said fuel supply means is inactivated to stop supplying the fuel to said combustion pad.

12. A combustion heater system according to claim 9, wherein said flame condition detecting means comprises a plurality of flame sensors disposed in said combustion chamber and spaced at respective different distances from said combustion pad.

13. A combustion heater system for use in a motor vehicle, comprising:

a combustion chamber;

a combustion pad disposed in said combustion chamber;

a fuel supply passage connected to said combustion pad for supplying a fuel to the combustion pad;

valve means for selectively opening and closing said fuel supply passage;

air supply means for supplying air to said combustion chamber;

heating means for heating said combustion pad;

spark means for producing sparks in said combustion chamber to ignite a fuel vapor emitted from said combustion pad;

flame condition detecting means for detecting a flame condition in said combustion chamber; and control means for energizing said heating means to heat the combustion pad for a predetermined period of time which begins with the energization of said heating means, and subsequently energizing said spark means to produce sparks in said combustion chamber and continuously energizing said spark means until a flame condition is detected by said flame condition detecting means.

* * * * *